(12) United States Patent
Ferguson

(10) Patent No.: US 7,970,971 B2
(45) Date of Patent: Jun. 28, 2011

(54) TAPPING SYSTEMS AND METHODS

(75) Inventor: Travis N. Ferguson, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 752 days.

(21) Appl. No.: 11/668,795

(22) Filed: Jan. 30, 2007

(65) Prior Publication Data

US 2008/0183939 A1 Jul. 31, 2008

(51) Int. Cl.
*H01R 13/62* (2006.01)
(52) U.S. Cl. .................... 710/301; 439/52; 439/325
(58) Field of Classification Search .......... 710/301–304; 714/43; 439/660, 52, 325
See application file for complete search history.

(56) References Cited

U.S. PATENT DOCUMENTS

| | | | | |
|---|---|---|---|---|
| 4,317,199 A * | 2/1982 | Winslow | | 714/30 |
| 4,520,314 A * | 5/1985 | Asch et al. | | 324/762 |
| 5,740,378 A * | 4/1998 | Rehl et al. | | 710/302 |
| 5,819,027 A * | 10/1998 | Budelman et al. | | 714/47 |
| 5,852,617 A * | 12/1998 | Mote, Jr. | | 714/726 |
| 5,865,651 A * | 2/1999 | Dague et al. | | 439/680 |
| 6,095,822 A * | 8/2000 | Corisis et al. | | 439/65 |
| 6,182,248 B1 * | 1/2001 | Armstrong et al. | | 714/43 |
| 6,308,234 B1 * | 10/2001 | Davies et al. | | 710/104 |
| 6,330,622 B1 * | 12/2001 | Schaefer | | 710/8 |
| 6,452,700 B1 * | 9/2002 | Mays, Jr. | | 359/15 |
| 6,490,694 B1 * | 12/2002 | Fenton et al. | | 714/25 |
| 6,580,616 B2 * | 6/2003 | Greenside et al. | | 361/752 |
| 6,652,325 B2 * | 11/2003 | Tharp et al. | | 439/660 |
| 6,697,968 B1 * | 2/2004 | Orfali | | 714/45 |
| 6,836,810 B1 * | 12/2004 | Klem et al. | | 710/301 |
| 7,068,120 B2 * | 6/2006 | Wu et al. | | 333/24 R |
| 7,075,797 B1 * | 7/2006 | Leonard et al. | | 361/803 |
| 7,104,807 B1 * | 9/2006 | Wang et al. | | 439/76.1 |
| 7,174,407 B2 * | 2/2007 | Hou et al. | | 710/301 |
| 7,206,733 B1 * | 4/2007 | Nemecek | | 703/25 |
| 7,378,832 B2 * | 5/2008 | Sutono et al. | | 324/76.19 |
| 7,414,418 B2 * | 8/2008 | Miller | | 324/754 |
| 7,596,650 B1 * | 9/2009 | Aditya et al. | | 710/301 |
| 2004/0201391 A1 * | 10/2004 | Miller | | 324/754 |
| 2005/0283559 A1 * | 12/2005 | Arad | | 710/305 |
| 2006/0033512 A1 * | 2/2006 | Schott et al. | | 324/754 |
| 2006/0264085 A1 * | 11/2006 | Kwatra et al. | | 439/329 |
| 2007/0016707 A1 * | 1/2007 | Loffink et al. | | 710/104 |

* cited by examiner

*Primary Examiner* — Paul R Myers
(74) *Attorney, Agent, or Firm* — Maschoff Gilmore & Israelsen

(57) ABSTRACT

A device may include a link configured to transmit signals. The signals may provide at least one network topology, such as a bus. A tapping structure may be connected to the device using, for example, at least one of a snap fit, a friction fit or an interference fit. The tapping structure may be configured to tap in-band signals, out-of-band signals, or both in-band signals and out-of-band signals.

13 Claims, 6 Drawing Sheets

TAPPING SYSTEMS AND METHODS

BACKGROUND

1. Field of the Invention

The present invention generally relates to tapping and, in particular, to tapping systems and methods.

2. Background Technology

PCI Express ("PCIe" or "PCI-E") devices may communicate via in-band signaling and out-of-band signaling. For example, PCIe devices may use out-of-band signaling for negotiation purposes. Unfortunately, some tapping systems used components that tapped in-band signaling less effectively and could not tap out-of-band signaling.

SUMMARY

A need therefore exists for systems and methods that eliminate or reduce the disadvantages and problems listed above and/or other disadvantages and problems.

One aspect is a system that may comprise a first device. The first device may include a link configured to transmit electrical signals. The electrical signals may provide at least one bus. The system may also include a tapping structure. The tapping structure may include a plurality of contacts, which may be sized and configured to abut a portion of the link to midbus tap at least a portion of one or more of the electrical signals. The tapping structure may be sized and configured to be connected to the first device using at least one of a snap fit, a friction fit or an interference fit.

Another aspect is a system that may comprise a first device. The first device including a link configured to transmit electrical signals. The electrical signals may provide at least one network topology. The electrical signals may include in-band signals and out-of-band signals. The system may also include a tapping structure. The tapping structure may include a plurality of contacts, which may be sized and configured to abut a portion of the link to tap at least a portion of one or more of the in-band signals and to tap at least a portion of one or more of the out-of-band signals. The tapping structure may be sized and configured to be connected to the first device using at least one of a snap fit, a friction fit or an interference fit.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limits its scope. These preferred embodiments will be described and explained with additional specificity and detail through the use of the accompanying drawings in which.

DETAILED DESCRIPTION

The present invention is generally directed towards tapping. The principles of the present invention, however, are not limited to tapping. It will be understood that, in light of the present disclosure, the tapping systems and methods disclosed herein can be successfully used in connection with other types of systems and methods.

Figure 1:
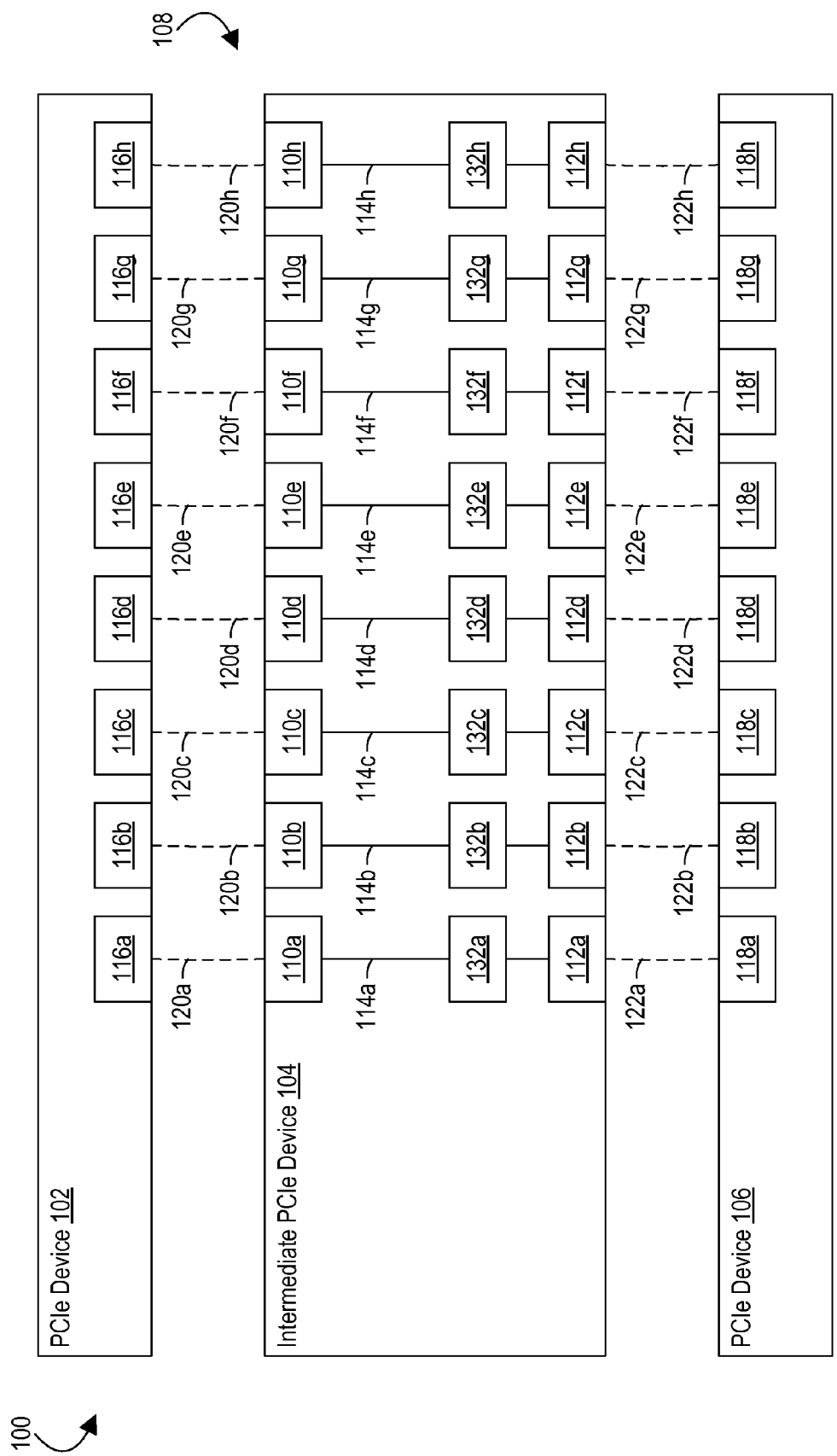
FIG. 1 is a block diagram of an exemplary embodiment of a system, illustrating exemplary embodiments of devices.

As shown in FIG. 1, a system 100 may include one or more devices, such as PCI Express ("PCIe" or "PCI-E") devices 102, 104, 106. PCIe devices may send data via a PCIe link, which preferably provides one or more lanes via which data may be transmitted and/or received. The PCIe link may provide, for example, 1, 2, 4, 8, 12, 16, or 32 lanes. Each lane is preferably implemented using one or more data wires, which are preferably constructed from a material (such as copper and/or other materials) configured to transmit a signal (such as an electrical signal) via which data is transmitted and/or received. In one embodiment, a lane may be implemented using four data wires (for example, a first differential pair of wires for transmitting data and a second differential pair of wires for receiving data). The one or more lanes may be used to provide one or more serial buses, one or more parallel buses, one or more other buses, one or more other network topologies, or any combination thereof. It will be appreciated, however, that a link may have any other suitable number of lanes and that a lane may be implemented using any number and/or type of data wires.

As shown in FIG. 1, the PCIe device 104 may be an intermediate PCIe device via which the PCIe devices 102, 106 may send data. For example, the PCIe devices 102, 106 may send data via a PCIe link 108 at least partially formed by the PCIe device 104. In particular, the PCIe device 104 may include input-output structures 110, 112 and wires 114 interconnecting the input-output structures 110, 112; and the lanes of the PCIe link 108 may be at least partially implemented using the input-output structures 110, 112 and the wires 114.

As shown in FIG. 1, the PCIe device 102 may include input-output structures 116, and the PCIe device 106 may include input-output structures 118. The input-output structures 116, 118 may be connected to the input-output structures 110, 112, respectively. For example, wires 120 may interconnect the input-output structures 110, 116, and wires 122 may interconnect the input-output structures 112, 118. Accordingly, the lanes of the PCIe link 108 may be at least partially implemented using the input-output structures 110, 112, 116, 118 and the wires 114, 120, 122. The PCIe link 108, however, does not require the input-output structures 110, 112, 116, 118 or the wires 120, 122. For example, in one embodiment, the input-output structures 110, 116 may directly contact, abut and/or engage each other, and the input-output structures 112, 118 may directly contact, abut and/or engage each other. Exemplary input-output structures include, but are not limited to, pins and ports.

Figure 2:
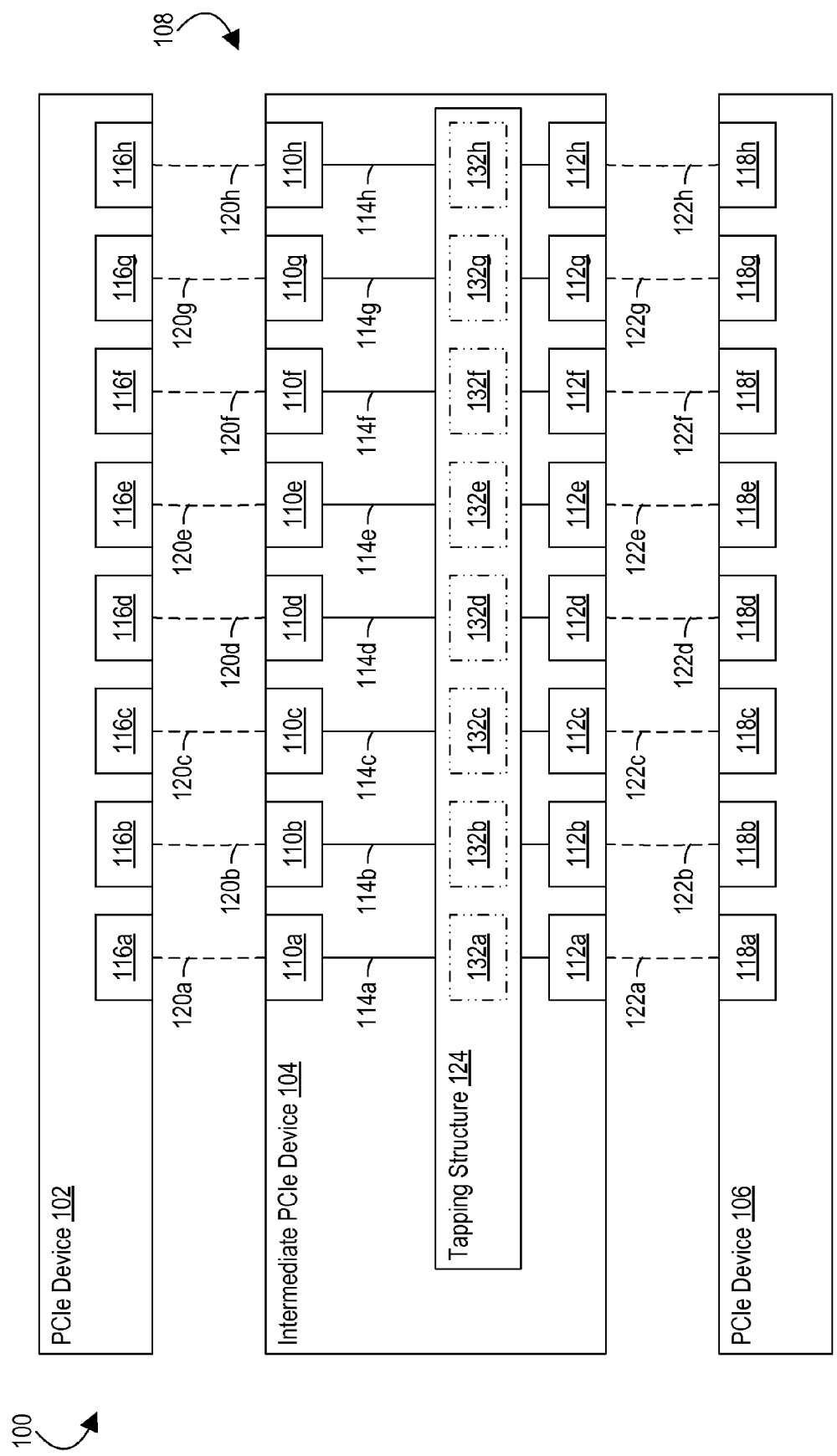
FIG. 2 is a block diagram of the system shown in FIG. 1, illustrating an exemplary embodiment of a tapping structure.

As shown in FIG. 2, the PCIe device 104 may include (or be connected to) a tapping structure 124. The tapping structure 124 may contact, abut and/or engage at least a portion of the PCIe link 108, which may allow the tapping structure 124 to be used to tap a portion of one or more of the signals transmitted via the PCIe link 108.

Figure 3:
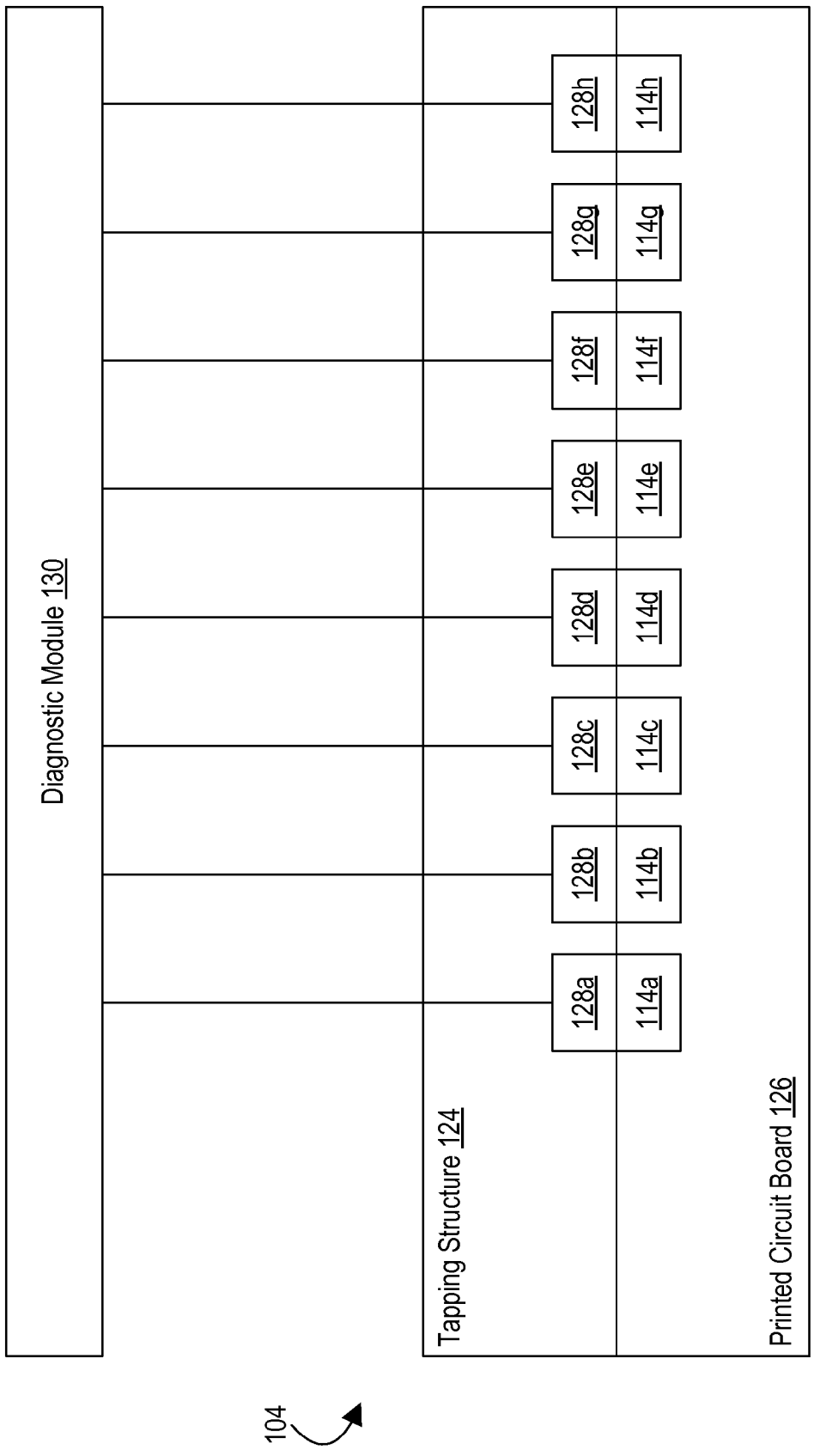
FIG. 3 is a block diagram of an exemplary embodiment of the system shown in FIG. 1, illustrating a cross-section of one of the devices connected to a diagnostic module.

In further detail, as shown in FIG. 3, the PCIe device 104 may include a printed circuit board 126, which may include the wires 114. The wires 114, as mentioned above, may form part of the PCIe link 108. The tapping structure 124 may contact, abut and/or engage the wires 114 to tap a portion of one or more of the signals transmitted via the PCIe link 108. For example, the tapping structure 124 may include contacts 128, which may contact, abut and/or engage the wires 114. The contacts 128 are preferably constructed from a material configured to transmit an electrical signal via which data is transmitted and/or received. The contacts 128 may be connected to a diagnostic module 130, which may receive a portion of one or more of the signals transmitted via the PCIe link 108 and may perform one or more diagnostic functions using the signals. If desired, an amplifier (not shown), such as a limiting amplifier, may be used to help provide the signals to the diagnostic module 130.

With the contacts 128 contacting, abutting and/or engaging the wires 114, the tapping structure 124 may be used to tap in-band signals, out-of-band signals, or both—which may advantageously allow the diagnostic module 130 to perform one or more diagnostic functions using the in-band signals, out-of-band signals, or both. In addition, with the contacts 128 contacting, abutting and/or engaging the wires 114 when the lanes of the PCIe link 108 are used to implement one or more buses, the tapping structure 124 may be used to midbus tap in-band signals, out-of-band signals, or both—which may advantageously help more effectively tap such signals.

Figure 4:
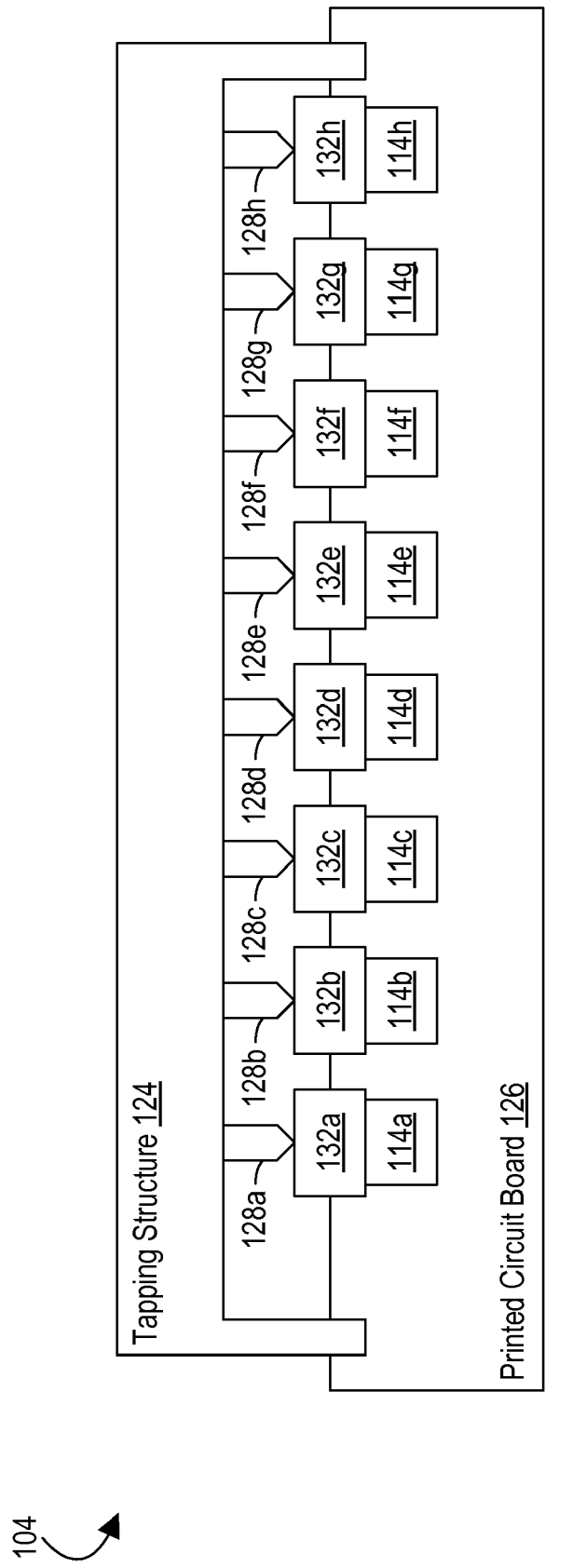
FIG. 4 is a block diagram of a cross-section of an exemplary device.
Figure 5:
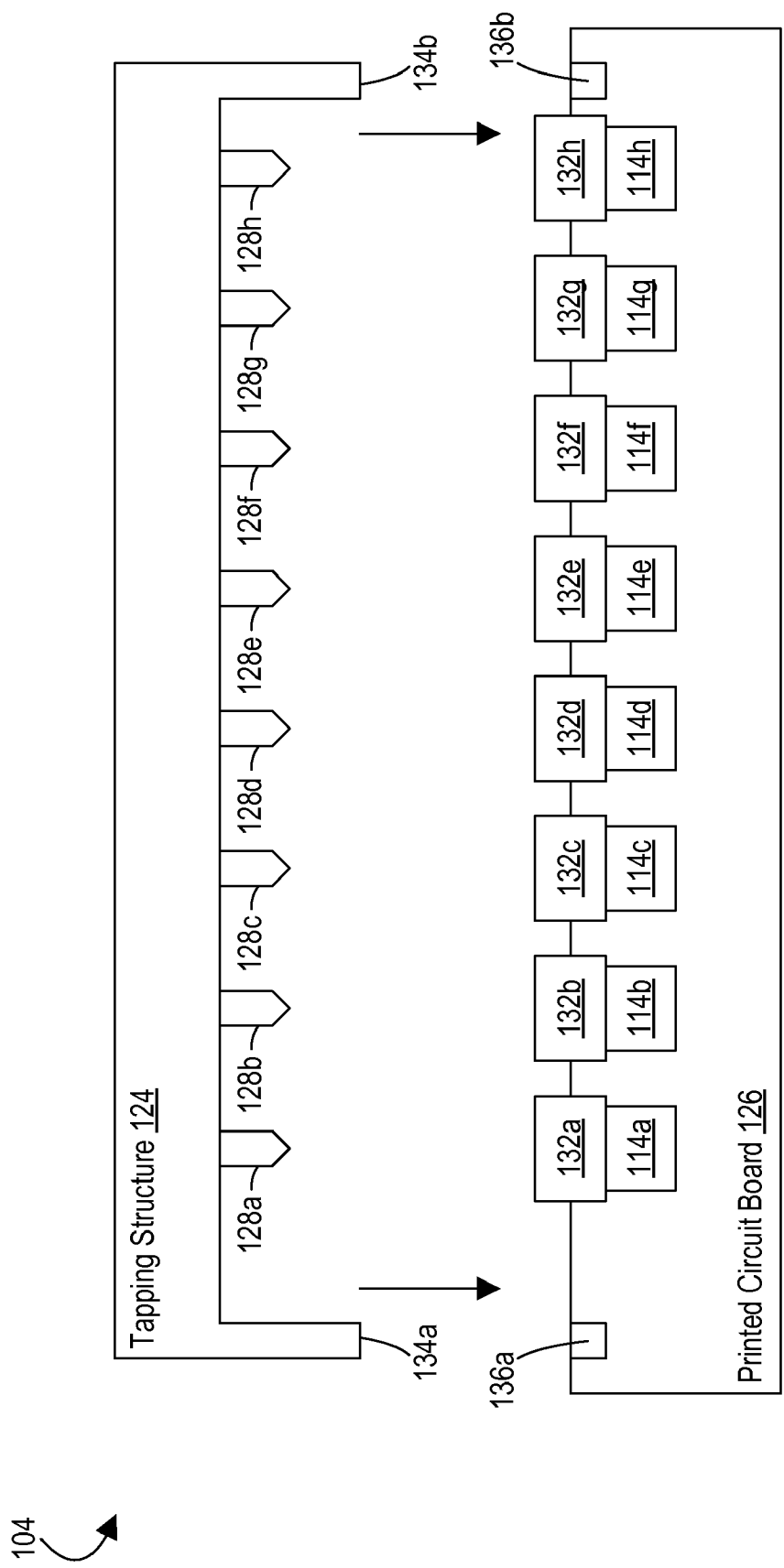
FIG. 5 is a block diagram of an exploded view of the device shown in FIG. 4.

As shown in FIGS. 4 and 5, the contacts 128 of the tapping structure 124 may have a pin-shaped configuration. In addition, the wires 114 may include (or be connected to) contacts 132. The contacts 132 may have a pad-shaped configuration and are preferably constructed from a material configured to transmit an electrical signal via which data is transmitted and/or received. As shown in FIG. 4, the contacts 128 may contact, abut and/or engage the contacts 132 to tap a portion of one or more of the signals transmitted via the PCIe link 108. It will be appreciated the contacts 128, 132 may have other suitable configurations having other suitable shapes.

As shown in FIGS. 4 and 5, the tapping structure 124 may be connected to a portion of the PCIe device 104 (such as, the printed circuit board 126) using a snap fit; a friction fit and/or an interference fit. For example, as shown in FIG. 5, the tapping structure 124 may include one or more outwardly extending portions 134, and the printed circuit board 126 may include one or more receiving portions 136 sized and configured to receive and/or retain the outwardly extending portions 134 using a snap fit; a friction fit and/or an interference fit. If desired, the printed circuit board 126 may include one or more outwardly extending portions, and the tapping structure 124 may include one or more receiving portions sized and configured to receive and/or retain the tapping structure's outwardly extending portions using a snap fit; a friction fit and/or an interference fit. Of course, the tapping structure 124 may be connected to the printed circuit board 126 using a snap fit; a friction fit and/or an interference fit; one or more adhesives; one or more fasteners; any other suitable means; or any combination thereof.

Figure 6:
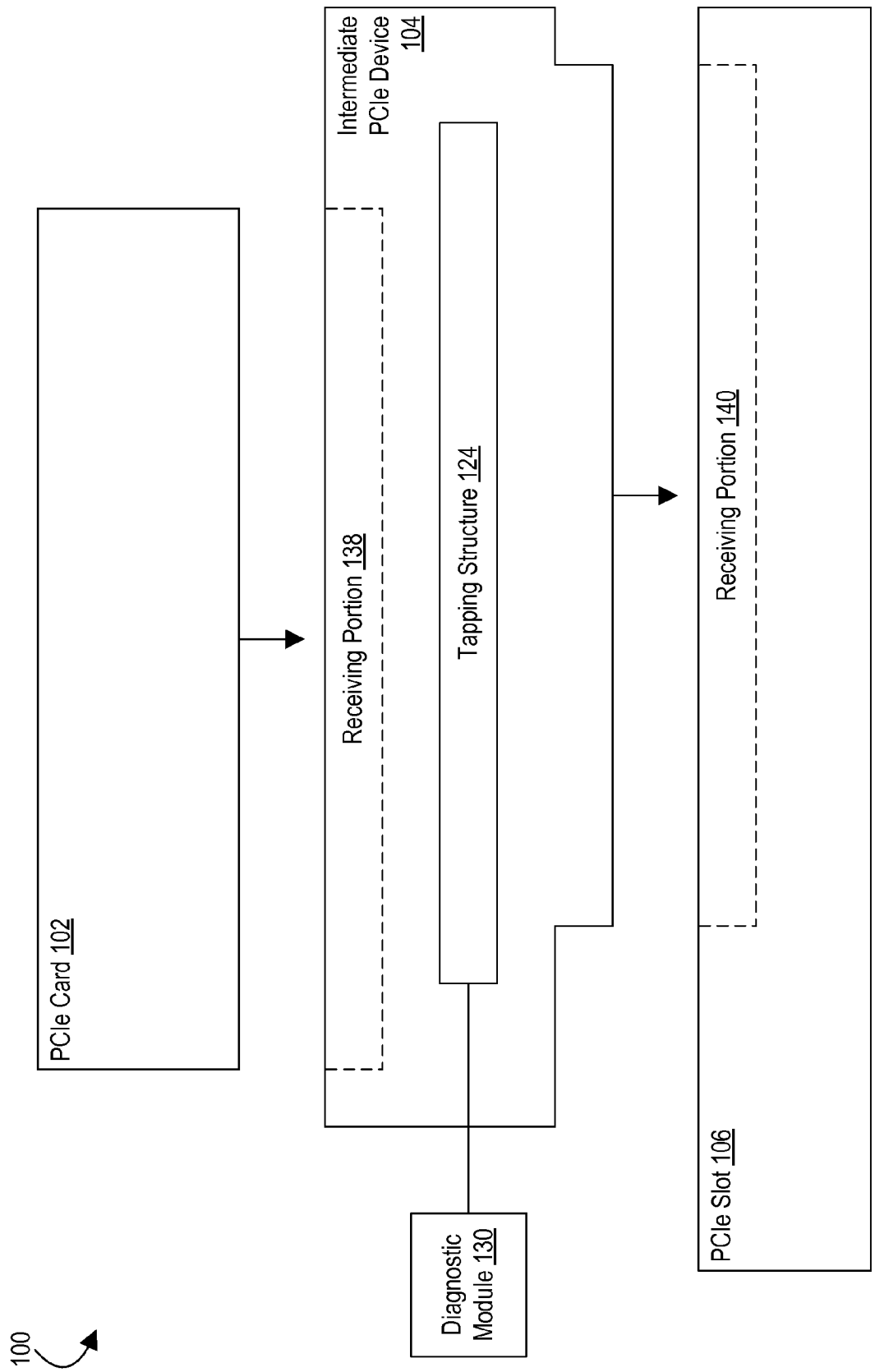
FIG. 6 is a block diagram of an exemplary embodiment of the system shown in FIG. 1.

In one embodiment, the PCIe device 102 may be a PCIe card, the PCIe device 106 may be a PCIe card slot, and the PCIe device 104 may be an intermediate PCIe device, as shown in FIG. 6. In further detail, the intermediate PCIe device 104 may include a receiving portion 138 sized and configured to receive at least a portion of the PCIe card 102; and the PCIe card slot 106 may include a receiving portion 140 sized and configured to receive at least a portion of the intermediate PCIe device 104. For example, to help the PCIe link 108 to be formed between the PCIe card 102 and the PCIe card slot 106, a portion of the PCIe card 102 may be inserted into the receiving portion of the intermediate PCIe device 104, and a portion of the intermediate PCIe device 104 may be inserted into the receiving portion 140 of the PCIe card slot 106. If desired, the receiving portion 138 may be sized and configured to receive at least a portion of the PCIe card 102 using a snap fit; a friction fit and/or an interference fit; and the receiving portion 140 may be sized and configured to receive at least a portion of the intermediate PCIe device 104 using, for example, a snap fit; a friction fit and/or an interference fit. As the PCIe card 102 and the PCIe card slot 106 transmit and/or receive signals via the PCIe link 108, the intermediate PCIe device 104 may be used to tap a portion of one or more of the signals transmitted via the PCIe link 108. It will be appreciated, however, that the PCIe device 102 need not be a PCIe card, the PCIe device 106 need not be a PCIe card slot, and the PCIe device 104 need not be an intermediate PCIe device and that the PCIe devices 102, 104, 106 may be other suitable PCIe devices.

One skilled in the art will also appreciate that, although aspects and features of the exemplary embodiments discussed above have been described with respect to PCIe devices, PCIe links, PCIe cards, intermediate PCIe devices and PCIe slots, these aspects and features may also be used in connection with other types of devices, links, cards, and slots.

Although this invention has been described in terms of certain preferred embodiments, other embodiments apparent to those of ordinary skill in the art are also within the scope of this invention. Accordingly, the scope of the invention is intended to is be defined only by the claims which follow.

What is claimed is:

1. A tapping assembly comprising:
an intermediate device interposed between a card and a card slot mounted on a printed circuit board, the intermediate device including a link configured to transmit electrical signals that provide at least one bus for communications between the card and the card slot, the intermediate device further including a receiving portion sized and configured to receive at least a portion of the card and a protruding portion sized and configured to be received by the card slot; and
a tapping structure separate from the card slot, the tapping structure including a plurality of contacts sized and configured to abut a portion of the intermediate device link to tap at least a portion of one or more of the electrical signals, the tapping structure being sized and configured to be selectively separable from and connectable to the intermediate device.

2. The tapping assembly as in claim 1, wherein the card is a PCI Express card.

3. The tapping assembly as in claim 1, wherein the card slot is a PCI Express card slot.

4. The tapping assembly as in claim 3, wherein the card is a PCI Express card.

5. A tapping system comprising the tapping assembly of claim 1, and further comprising the card and the card slot.

6. The tapping system as in claim 5, wherein the card has a plurality of pins and the card slot has a plurality of ports that correspond to the pins of the card.

7. The tapping assembly as in claim 1, wherein the link is configured to transmit electrical signals that provide at least one serial bus.

8. The tapping assembly as in claim 1, wherein the link is configured to transmit electrical signals that provide at least one parallel bus.

9. The tapping assembly as in claim 1, wherein the link is a PCI Express link.

10. The tapping assembly as in claim 1, wherein the plurality of contacts of the tapping structure have a pin-shaped configuration.

11. The tapping assembly as in claim 1, wherein the intermediate device further includes:
   a printed circuit board; and
   a plurality of pad-shaped contacts on a face of the printed circuit board, each pad-shaped contact corresponding to one of the plurality of tapping structure contacts, the pad-shaped contacts being arranged such that the tapping structure contacts abut the pad-shaped contacts of the device when the tapping structure is connected to the device.

12. The tapping assembly as in claim 1, wherein the tapping structure is sized and configured to be selectively separable from and connectable to the intermediate device using at least one of a snap fit, a friction fit or an interference fit.

13. The tapping assembly as in claim 1, wherein the receiving portion of the intermediate device is oriented to face the same direction as a receiving portion of the card slot into which the protruding portion of the intermediate device is sized and configured to be received.

* * * * *